(12) United States Patent
Kito et al.

(10) Patent No.: US 12,547,710 B2
(45) Date of Patent: Feb. 10, 2026

(54) ATTACK MEANS EVALUATION APPARATUS, ATTACK MEANS EVALUATION METHOD, AND COMPUTER READABLE MEDIUM

(71) Applicant: Mitsubishi Electric Corporation, Tokyo (JP)

(72) Inventors: Keisuke Kito, Tokyo (JP); Kiyoto Kawauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 342 days.

(21) Appl. No.: 18/088,453

(22) Filed: Dec. 23, 2022

(65) Prior Publication Data

US 2023/0137325 A1 May 4, 2023

Related U.S. Application Data

(63) Continuation of application No. PCT/JP2020/031149, filed on Aug. 18, 2020.

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC ............. G06F 21/554; G06F 2221/033; G06F 2221/034; G06F 21/566; G06F 21/577
See application file for complete search history.

(56) References Cited

U.S. PATENT DOCUMENTS

2005/0241000 A1  10/2005  Kawauchi
2008/0256638 A1*  10/2008  Russ .................. G06F 21/577
726/25
(Continued)

FOREIGN PATENT DOCUMENTS

CN   110912945 A    3/2020
CN   111475818 A *  7/2020  .......... G06F 21/577
(Continued)

OTHER PUBLICATIONS

German Office Action dated Oct. 24, 2023 for Application No. 11 2020 007 314.9 with an English translation.
(Continued)

*Primary Examiner* — Han Yang
(74) *Attorney, Agent, or Firm* — Birch, Stewart, Kolasch & Birch, LLP (57) ABSTRACT

An attack means evaluation apparatus (100) evaluates an attack means used in a cyberattack. A score value calculation unit (110) obtains a plurality of attack means, and for each attack means of the plurality of attack means, calculates a score value that shows validity of an attack on an attack target system. A means selection unit (120) selects an attack means that is valid as an attack on the attack target system from the plurality of attack means using the score value of each attack means of the plurality of attack means and a threshold (173). A means execution unit (130) executes the attack means that is selected on the attack target system, and verifies whether or not an attack for achieving a final aim of the cyberattack is possible based an execution result of the attack means that is selected.

7 Claims, 6 Drawing Sheets

(56) References Cited

U.S. PATENT DOCUMENTS

| | | | |
|---|---|---|---|
| 2011/0035803 A1 | 2/2011 | Lucangeli Obes et al. | |
| 2011/0061104 A1* | 3/2011 | Sarraute Yamada | H04L 43/50 726/23 |
| 2019/0166164 A1 | 5/2019 | Yamada et al. | |
| 2020/0065482 A1 | 2/2020 | Taniguchi et al. | |
| 2020/0145446 A1* | 5/2020 | Deardorff | H04L 63/20 |
| 2020/0145449 A1 | 5/2020 | Segal et al. | |
| 2021/0029154 A1* | 1/2021 | Picard | H04L 63/1441 |

FOREIGN PATENT DOCUMENTS

| | | |
|---|---|---|
| JP | 2004-145413 A | 5/2004 |
| JP | 2015-114833 A | 6/2015 |
| JP | 2018-195197 A | 12/2018 |
| JP | 2018-196054 A | 12/2018 |
| JP | 2019-101672 A | 6/2019 |
| JP | 2019-125267 A | 7/2019 |
| JP | 2019-191657 A | 10/2019 |

OTHER PUBLICATIONS

"CALDERA™", mitre/caldera, Automated Adversary Emulation Platform, https://github.com/mitre/caldera, retrieved on Oct. 19, 2022, pp. 1-4.

Andy Applebaum, "Finding Dependencies Between Adversary Techniques", FIRST Annual Conference 2019, Jun. 19, 2019, https://www.first.org/resources/papers/conf2019/1100-Applebaum.pdf, total of 85 pages.

International Search Report for PCT/JP2020/031149 (PCT/ISA/210) mailed on Nov. 24, 2020.

Chinese Office Action and Search Report for Chinese Application No. 202080104132.2, dated May 30, 2025, with English translation of the Office Action.

\* cited by examiner

107: SCORE VALUE DATABASE

| ATTACK MEANS | ATTACK DETECTION PROBABILITY pi | ATTACK SUCCESS PROBABILITY |
|---|---|---|
| STEALTH NETWORK SCAN | 0.06 | (AMOUNT OF INFORMATION THAT CAN BE OBTAINED IS SMALL) |
| NETWORK SCAN | 0.2 | (AMOUNT OF INFORMATION THAT CAN BE OBTAINED IS LARGE) |
| ATTACK CODE 1 | 0.3 | 0.2 |
| ATTACK CODE 2 | 0.35 | 0.5 |
| ATTACK CODE 3 | 0.5 | 0.7 |

Fig. 6

ATTACK MEANS EVALUATION APPARATUS, ATTACK MEANS EVALUATION METHOD, AND COMPUTER READABLE MEDIUM

CROSS REFERENCE TO RELATED APPLICATION

This application is a Continuation of PCT International Application No. PCT/JP2020/031149, filed on Aug. 18, 2020, which is hereby expressly incorporated by reference into the present application.

TECHNICAL FIELD

The present disclosure relates to an attack means evaluation apparatus, an attack means evaluation method, and an attack means evaluation program.

BACKGROUND ART

Vulnerability, a weakness in security, is a social issue. In recent years, carrying out vulnerability testing is in demand before a release of a system or before shipping a product. There is penetration testing for one of techniques of the vulnerability testing. With the penetration testing, by performing a simulated cyberattack on a test target system, existence or non-existence of vulnerability, effects of when vulnerability is taken advantage of, and whether or not a cyberattack can be correctly detected, can be confirmed. The penetration testing is carried out by a specialized technician called a penetration tester who has thorough knowledge of security technology. The penetration testing is typically black-box testing. A penetration tester deduces an internal structure based on a response and behavior of a system when an input that causes vulnerability is given, and selects a simulated attack means that must be carried out next.

In Non-Patent Literature 1, CALDERA, a tool that supplements based on dependency of an attack means that is set, an attack means that is lacking among attack scenarios created, is indicated. CALDERA uses knowledge called ATT&CK (registered trademark) in which tactics that a cyberattacker uses are systematically organized. In Non-Patent Literature 1, technology to analyze from attack cases from the past, an attack means used after an attack means and to select an attack means that is in a co-occurrence relationship is also indicated.

In Patent Literature 1, a means to perform a simulated attack for diagnosing a security hole is indicated. In Patent Literature 1, a means for satisfying dependency necessary for attack execution is deduced from dependency, and a cyberattack is automatically performed. For example, in Patent Literature 1, attack means are accumulated in a database in advance, and in a case where there is a condition for executing an attack means, a different attack means is executed to satisfy the necessary condition according to an attack scenario.

CITATION LIST

Patent Literature

Patent Literature 1: JP 2004-145413 A

Non-Patent Literature

Non-Patent Literature 1: Andy Applebaum, Finding Dependencies Between Adversary Techniques, FIRST Annual Conference 2019, 2019 Jun. 19, https://www.first.org/resources/papers/conf2019/1100-Applebaum.pdf

SUMMARY OF INVENTION

Technical Problem

The technology introduced in conventional art cannot execute a cyberattack that a skilled penetration tester would perform. For example, the technology of Non-Patent Literature 1 merely generates a column of attack means that is based on a cyberattack case that is already reported, in other words, a cyberattack scenario. To actually execute an attack, a parameter or an option of an attack tool is necessary to be set by a user. In Patent Literature 1, a different attack means that is necessary is deduced and executed to satisfy the dependency necessary for executing the attack means. For this reason, difficulty of finding the attack means or the parameter of the attack tool is necessary to be defined by a user. There is no guarantee that an attack means that escapes a cyberattack detection system is selected as in a way of selection of the attack means by a professional penetration tester.

The present disclosure aims to reproduce a sophisticated cyberattack without necessitating a skilled penetration tester by scoring an attack means that must be executed.

Solution to Problem

An attack means evaluation apparatus according to the present disclosure evaluates an attack means used in a cyberattack. The attack means evaluation apparatus includes:
  a score value calculation unit to obtain a plurality of attack means, and for each attack means of the plurality of attack means, to calculate a score value that shows validity of an attack on an attack target system, the attack target system being a target of the attack;
  a means selection unit to select an attack means that executes the attack on the attack target system from the plurality of attack means based on the score value; and
  a means execution unit to execute the attack means that is selected on the attack target system, and to verify whether or not an attack for achieving a final aim of the cyberattack is possible based an execution result of the attack means that is selected.

Advantageous Effects of Invention

By an attack means evaluation apparatus according to the present disclosure, reproduction of a sophisticated cyberattack can be automated by scoring an attack means, selecting the attack means by a score value, and verifying, with regard to the attack means that is selected, whether or not a final aim of a cyberattack is possible.

DESCRIPTION OF EMBODIMENTS

The present embodiments will be described hereinafter using the drawings. Throughout the drawings, the same reference signs are added to the same or corresponding portions. In the description of the embodiments, a description of the same or corresponding portions will be suitably omitted or simplified.

Embodiment 1

Description of Configuration

Figure 1:
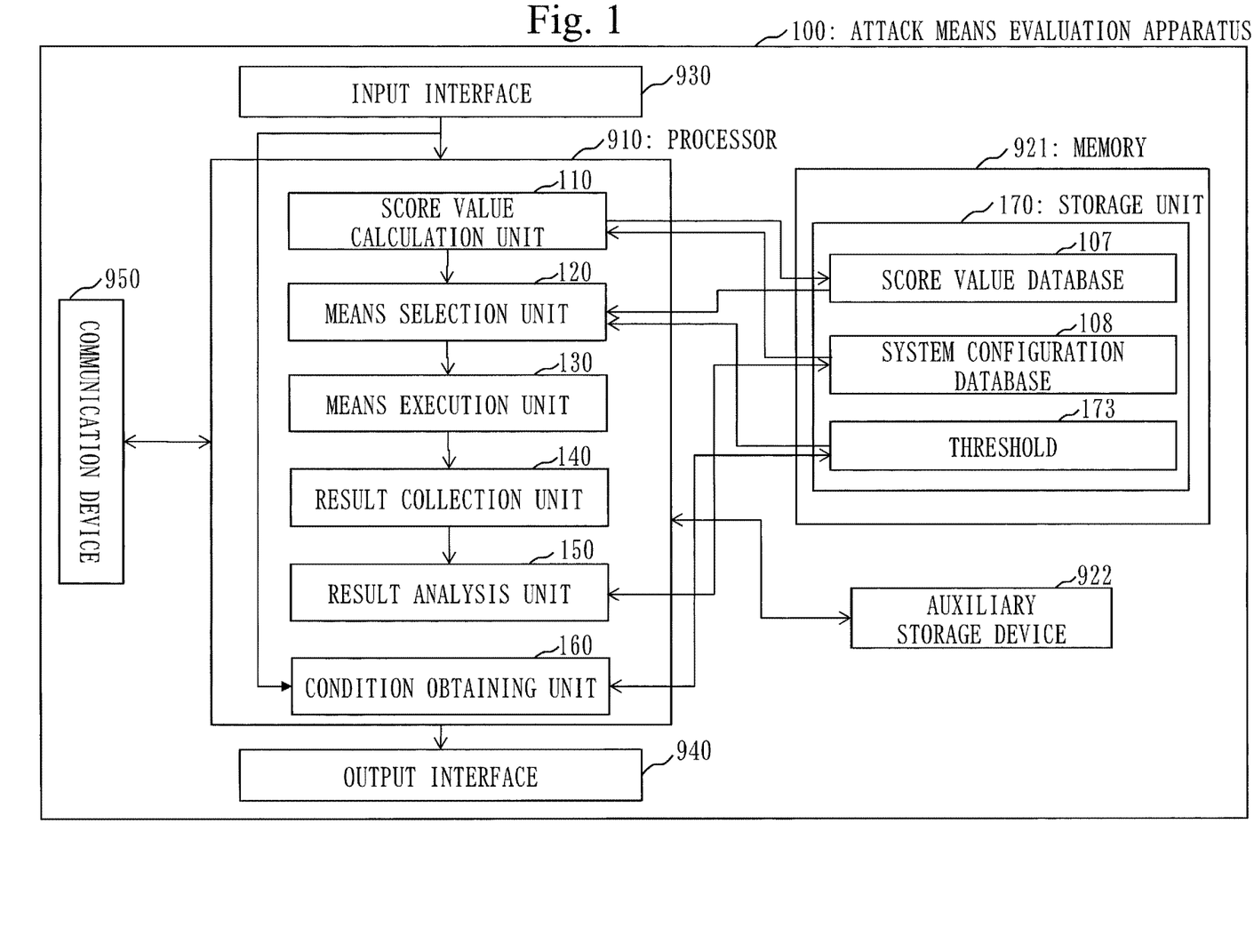
FIG. 1 is an example of a configuration of an attack means evaluation apparatus according to Embodiment 1.

An example of a configuration of an attack means evaluation apparatus 100 according to the present embodiment will be described using FIG. 1.

The attack means evaluation apparatus 100 is a computer. The attack means evaluation apparatus 100 includes a processor 910 and other hardware such as a memory 921, an auxiliary storage device 922, an input interface 930, an output interface 940, and a communication device 950. The processor 910 is connected to other hardware through signal lines, and controls these other hardware.

The attack means evaluation apparatus 100 according to the present embodiment evaluates an attack means that configures a cyberattack on an attack target system. The attack means that configure the cyberattack may be one or more than one. Specifically, the attack means evaluation apparatus 100 evaluates goodness of the attack means in a certain situation as a score value. The goodness of the attack means is also called validity of an attack. For example, the goodness of the attack means is an index such as difficulty of finding the attack means or certainty of an attack, and any evaluation axis is possible.

In the present embodiment, the attack means configures the cyberattack. A column of at least one of the attack means that configures the cyberattack is also called an attack scenario. The attack means is also called an attack technique, an attack tool, an attack code, or an attack command.

In the attack means evaluation apparatus 100, as information relating to a system configuration of the attack target system that is an attack target becomes discovered, a score value of the attack means becomes refined. And, the attack means evaluation apparatus 100 becomes possible to select an attack means that is close to an actual attacker by the score value becoming refined.

The attack means evaluation apparatus 100 includes, as functional elements, a score value calculation unit 110, a means selection unit 120, a means execution unit 130, a result collection unit 140, a result analysis unit 150, a condition obtaining unit 160, and a storage unit 170. A score value database 107, a system configuration database 108, and a threshold 173 are stored in the storage unit 170.

Functions of the score value calculation unit 110, the means selection unit 120, the means execution unit 130, the result collection unit 140, the result analysis unit 150, and the condition obtaining unit 160 are enabled by software. The storage unit 170 is included in the memory 921. The storage unit 170 may be included in the auxiliary storage device 922, or may be included by being distributed in the memory 921 and the auxiliary storage device 922.

The processor 910 is a device that executes an attack means evaluation program. The attack means evaluation program is a program that enables the functions of the score value calculation unit 110, the means selection unit 120, the means execution unit 130, the result collection unit 140, the result analysis unit 150, and the condition obtaining unit 160.

The processor 910 is an IC (Integrated Circuit) that performs a calculation process. Specific examples of the processor 910 are a CPU (Central Processing Unit), a DSP (Digital Signal Processor), and a GPU (Graphics Processing Unit).

The memory 921 is a storage device that stores data temporarily. A specific example of the memory 921 is an SRAM (Static Random Access Memory) or a DRAM (Dynamic Random Access Memory).

The auxiliary storage device 922 is a storage device that stores data. A specific example of the auxiliary storage device 922 is an HDD. The auxiliary storage device 922 may be a portable storage medium such as an SD (registered trademark) memory card, a CF, a NAND flash, a flexible disc, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port connected to an input device such as a mouse, a keyboard, or a touch panel. The input interface 930 is, specifically, a USB (Universal Serial Bus) terminal. The input interface 930 may be a port connected to a LAN (Local Area Network).

The output interface 940 is a port to which a cable of an output device such as a display is connected. The output interface 940 is, specifically, a USB terminal or an HDMI (registered trademark) (High Definition Multimedia Interface) terminal. The display is, specifically, an LCD (Liquid Crystal Display). The output interface 940 is also called a display interface.

The communication device 950 has a receiver and a transmitter. The communication device 950 is connected to a communications network such as the LAN, the Internet, or a telephone line. The communication device 950 is, specifically, a communication chip or an NIC (Network Interface Card).

The attack means evaluation program is executed in the attack means evaluation apparatus 100. The attack means evaluation program is read into the processor 910, and executed by the processor 910. Not only the attack means evaluation program but also an OS (Operating System) is stored in the memory 921. The processor 910 executes the attack means evaluation program while executing the OS. The attack means evaluation program and the OS may be stored in the auxiliary storage device 922. The attack means evaluation program and the OS stored in the auxiliary storage device 922 are loaded into the memory 921 and executed by the processor 910. A part or all of the attack means evaluation program may be built into the OS.

The attack means evaluation apparatus 100 may include a plurality of processors that replace the processor 910. These plurality of processors share the execution of the attack means evaluation program. Each processor is, as with the processor 910, a device that executes the attack means evaluation program.

Data, information, signal values, and variable values used, processed, or outputted by the attack means evaluation program are stored in the memory 921, the auxiliary storage device 922, or a register or a cache memory in the processor 910.

"Unit" of each unit of the score value calculation unit 110, the means selection unit 120, the means execution unit 130, the result collection unit 140, the result analysis unit 150, and the condition obtaining unit 160 may be replaced with "process", "procedure", or "step". The attack means evaluation program causes a computer to execute a score value calculation process, a means selection process, a means execution process, a result collection process, a result analysis process, and a condition obtaining process. "Process" of the score value calculation process, the means selection process, the means execution process, the result collection process, the result analysis process, and the condition obtaining process may be replaced with "program", "program product", "computer-readable storage medium having stored a program", or "computer-readable recording medium having recorded a program". An attack means evaluation method is a method performed by the attack means evaluation apparatus 100 executing the attack means evaluation program.

The attack means evaluation program may be provided being stored in a computer-readable recording medium. The attack means evaluation program may be provided as a program product.

Description of Operation

Figure 2:
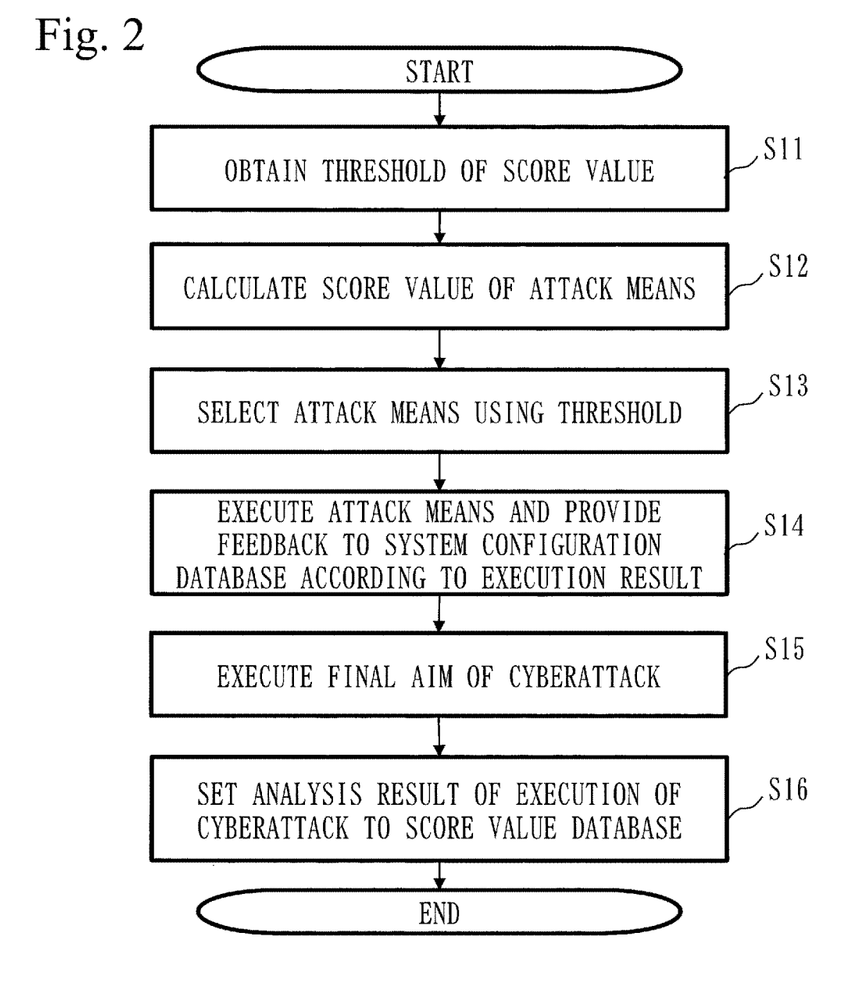
FIG. 2 is a flow diagram showing operation of the attack means evaluation apparatus according to Embodiment 1.

Next, an operation summary of the attack means evaluation apparatus 100 according to the present embodiment will be described using FIG. 2. An operation procedure of the attack means evaluation apparatus 100 is equivalent to the attack means evaluation method. A program that enables operation of the attack means evaluation apparatus 100 is equivalent to the attack means evaluation program.

The attack means evaluation apparatus 100 evaluates the attack means used in the cyberattack.

In step S11, the condition obtaining unit 160 obtains the threshold 173 that is to be a standard for selecting the attack means. Specifically, the condition obtaining unit 160 obtains the threshold 173 from a user through the input interface 930. Specifically, the threshold 173 is a value such as an attack detection probability that shows a probability of the attack means being detected by an attack detection tool such as a security detection device when the attack means is executed.

For example, in a case where the user wants to consider stealth such as not wanting an attack being detected by the security detection device as important, the score value is calculated as the attack detection probability. And, an attack means with the attack detection probability calculated that is lowest is selected as most valid attack means against the attack target system.

The condition obtaining unit 160 obtains threshold pth of the attack detection probability from the user through the input interface 930.

In step S12, the score value calculation unit 110 obtains a plurality of attack means, and for each attack means of the plurality of attack means, calculates a score value that shows the validity of an attack on the attack target system. Calculating the score value is also called evaluating the score value.

The system configuration of the attack target system that is to be the attack target is set in the system configuration database 108. Information such as an attack materialization condition that considers the attack on the attack target system as materialized is set in the system configuration database 108.

The score value calculation unit 110 calculates the score value of each attack means of the plurality of attack means based on the system configuration database 108. The score value calculation unit 110 calculates the score value based on the system configuration of the attack target system included in the system configuration database 108.

For example, the score value calculation unit 110 calculates as the score value, the attack detection probability that shows a degree of how easily detected an attack is in the attack target system.

Figure 3:
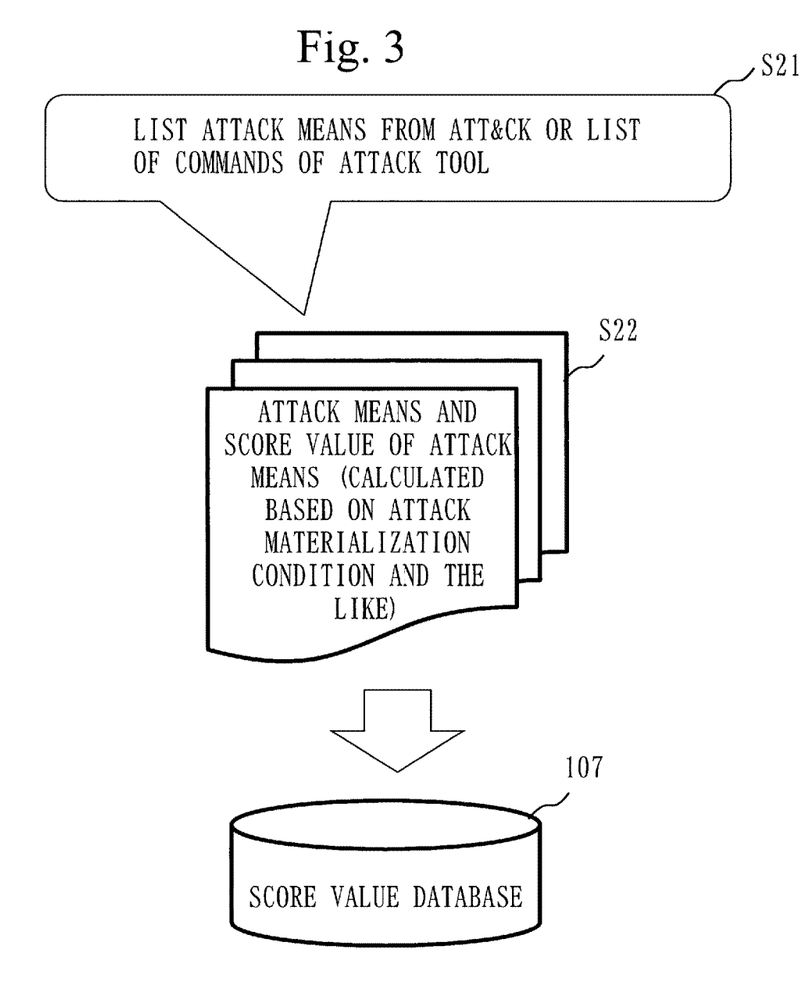
FIG. 3 is a schematic view showing a setting process of a score value database according to Embodiment 1.

FIG. 3 is a schematic view illustrating a setting process of the score value database 107 according to the present embodiment.

In step S21, the score value calculation unit 110, for example, lists attack means from ATT&CK (registered trademark) or a list of commands of the attack tool. A final aim is set in the cyberattack. In the cyberattack, a plurality of attack means for achieving the final aim are carried out, and in the end, an attack for achieving the final aim is executed. The attack means that are listed from ATT&CK (registered trademark) or the list of commands of the attack tool are equivalent to the attack means that configure one cyberattack.

In step S22, the score value calculation unit 110 calculates the score value of each attack means based on the attack materialization condition, and sets the score value of each attack means in the score value database 107. Specifically, the score value calculation unit 110 calculates the score value based on the attack materialization condition such as ATT&CK (registered trademark) or a CVSS (Common Vulnerability Scoring System) value of vulnerability that is used. The score value is not a fixed value and is similar to a function value. For example, since a score value of an attack means that is targeted for Windows (registered trademark) becomes a completely meaningless attack for a case where a target is Linux (registered trademark), the score value becomes 0. Others such as covertness of an attack or certainty of an attack may be shown as the score value.

In step S13, the means selection unit 120 selects an attack means that is valid as an attack on the attack target system from the plurality of attack means using the score value of each attack means of the plurality of attack means and the threshold 173. The means selection unit 120 selects an attack means to be executed from the attack means set in the score value database 107 using the threshold 173. Specifically, the means selection unit 120 enumerates attack means with the score values that are equal to or below threshold pth of the attack detection probability from the attack means set in the score value database 107. And, the means selection unit 120 selects as an attack means to be executed, the attack means with the attack detection probability that is the lowest, the attack detection probability being the score value, from among the attack means enumerated.

Or, the means selection unit 120 may enumerate the plurality of attack means based on the threshold 173, present the plurality of attack means to the user through the output interface 940, and have the user select an attack means to be executed.

Next, in step S14 to step S15, the means execution unit 130 executes the cyberattack on the attack target system by executing the attack means that is selected on the attack target system.

First, in step S14, the means execution unit 130 executes the attack means that is selected on the attack target system.

The means execution unit 130 quotes from the system configuration database 108, a parameter that is necessary for the execution, and executes the attack means that is selected. The parameter that is necessary for the execution is, for example, information such as an IP (Internet Protocol) address of an attack destination.

The means execution unit 130 executes the attack means that is selected on the attack target system, and verifies whether or not the attack for achieving the final aim of the cyberattack is possible based on an execution result of the attack means that is selected. And, the means execution unit 130, when verifying that the attack for achieving the final aim is possible, executes the attack for achieving the final aim. The means execution unit 130, when verifying that the attack for achieving the final aim is not possible, passes the execution result to the result collection unit 140.

The result collection unit 140 collects execution results of the attacks by the attack means.

When the attack for achieving the final aim is verified as not possible, the result analysis unit 150 analyzes the system configuration of the attack target system based on the execution result of the attack means that is selected, and provides feedback on an analysis result to the system configuration database 108. Specifically, the result analysis unit 150 obtains the execution result and verifies success or failure of the attack. In a case where a means that is executed is not an attack, but a reconnaissance activity such as network scanning, the result analysis unit 150 obtains a scanning result as the execution result. The result analysis unit 150 analyzes the execution result. The result analysis unit 150 provides feedback on the analysis result to the system configuration database 108. As described, the system configuration database 108 is updated every time the attack means on the attack target system is executed until the attack for achieving the final aim becomes possible.

The means execution unit 130 causes the above operation to operate repeatedly until execution of every attack means that configures the cyberattack ends. When a condition for executing the final aim of the cyberattack that the user inputted is satisfied, the means execution unit 130 executes the final aim of the cyberattack that is to be a goal (step S15). In a case where the execution condition is not satisfied, the means execution unit 130 repeats the process until the execution condition is satisfied. The case where the execution condition of the final aim is not satisfied is a case where information necessary for the execution is not complete or network reachability necessary for executing is not secured. The analysis result of execution of cyberattack is set in the score value database 107 (step S16).

Figure 4:
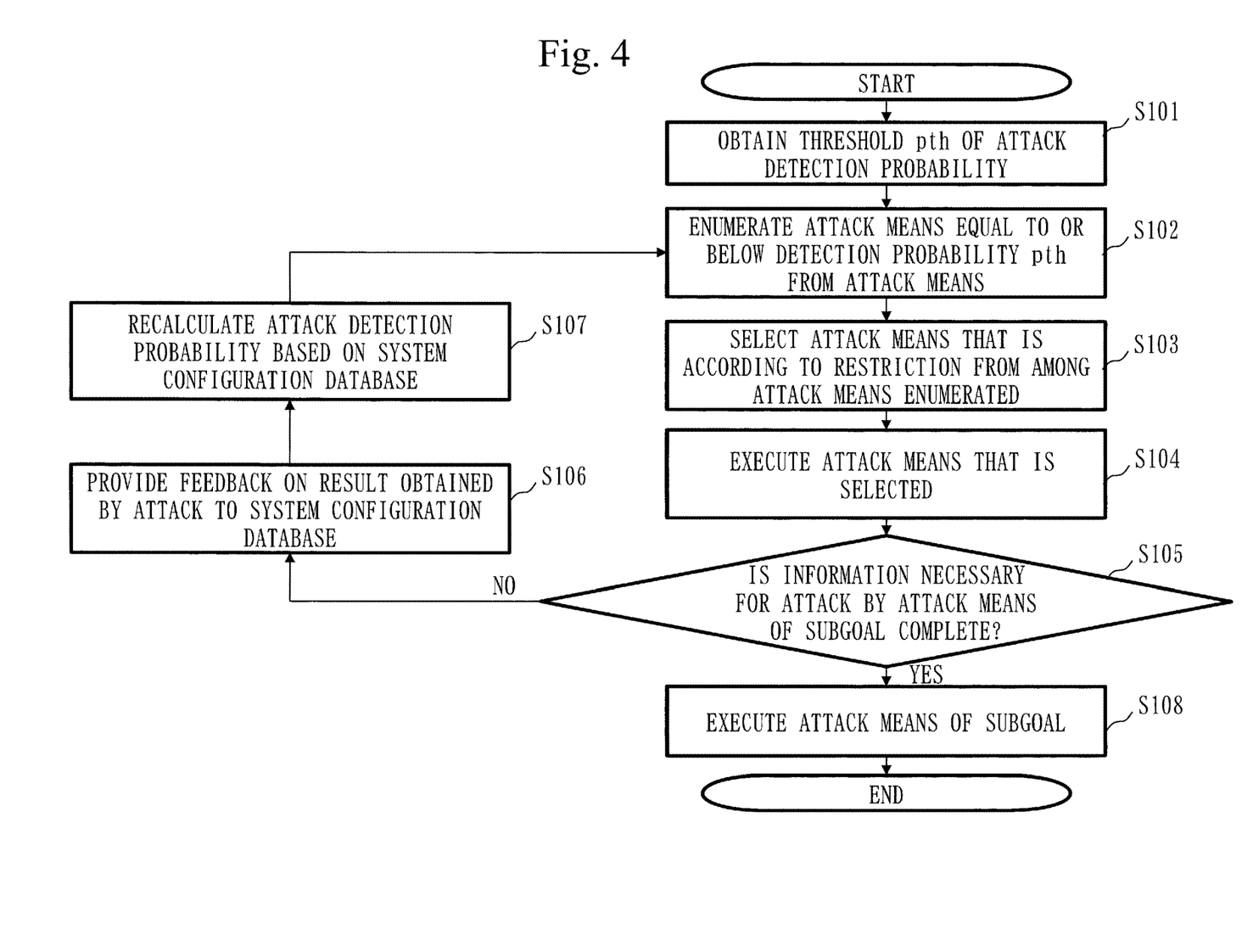
FIG. 4 is a flow diagram showing a detailed example of the operation of the attack means evaluation apparatus according to Embodiment 1.

FIG. 4 is a flow diagram illustrating a detailed example of the operation of the attack means evaluation apparatus 100 according to the present embodiment. In FIG. 4, a description will be given such that the score value is the attack detection probability.

In FIG. 4, a case where an attack means of a subgoal, the subgoal being an aim one before the final aim of the cyberattack, is executed will be described. A similar process can be applied even in a case where the subgoal is the final aim of the cyberattack.

In step S101, the condition obtaining unit 160 obtains threshold pth of the attack detection probability from the user through the input interface 930.

In step S102, the score value calculation unit 110 obtains the plurality of attack means, and calculates the attack detection probability of each attack means as the score value based on the system configuration database 108. And, the means selection unit 120 enumerates attack means with the score values that are equal to or below threshold pth of the attack detection probability from the attack means set in the score value database 107.

In step S103, the means selection unit 120 selects as an attack means to be executed, an attack mean that is according to a restriction from among the attack means enumerated. Specifically, the means selection unit 120 selects as an attack means to be executed, the attack means with the attack detection probability that is the lowest from among the attack means enumerated. The attack means with the attack detection probability that is the lowest means an attack means that is most difficult to detect. In other words, the attack means is most valid attack means for an attack on the attack target system. There is also a case where the attack means that is selected is a reconnaissance means.

In step S104, the means execution unit 130 executes the attack means that is selected on the attack target system.

In step S105, the result collection unit 140 collects execution results of attacks by the attack means. The result collection unit 140 verifies whether or not information necessary for an attack by the attack means of the subgoal is complete. In a case where the information necessary for the attack by the attack means of the subgoal is complete, the process proceeds to step S108. In a case where the information necessary for the attack by the attack means of the subgoal is not complete, the process proceeds to step S106.

In step S106, the result analysis unit 150 analyzes an execution result of the attack means that is selected, and provides feedback on an analysis result to the system configuration database 108.

In step S107, the score value calculation unit 110 recalculates the score value of each attack means based on the system configuration of the attack target system included in the system configuration database 108 to where the feedback on the analysis result is provided. And, the score value calculation unit 110 repeats the processes from enumeration of the attack means in step S102.

In the system configuration database 108, information of the attack target system such as an IP address and an OS of an information system, version information of software that is being used, or a firewall rule is included. Immediately after intruding into the attack target system, these pieces of information are unknown. Therefore, in the cyberattack, information on the attack target system is collected by performing the network scanning or sniffing. By storing results that are collected in the system configuration database 108, calculation accuracy of the score value that uses the results can be improved.

In step S108, the means execution unit 130 executes the attack means of the subgoal.

The final aim of the cyberattack described in FIG. 3 is a goal of the cyberattack that an attacker must achieve such as a theft of information or destruction of the information system. Immediately after intruding into a system, however, it is not always true that the attacker has already been able to intrude into a terminal where the final aim can be achieved. For this reason, necessity for attacking a different terminal or a server arises. The attack on a different terminal or a different server such as the above is an example of the attack means of the subgoal mentioned above.

On the other hand, "a goal of a cyberattack that a user inputs" is the final aim of the attack as mentioned above. In a case where a goal of the cyberattack being "destroy data of an XX system" is set, a goal being "intrude into an XX system" becomes a subgoal that is an aim one before the final aim. Similarly, there is a case where a sub-subgoal exists in the subgoal. As described, the cyberattack is assumed to have such a form as what is called an attack tree.

A state in step S105 of FIG. 4 being "information necessary for an attack by the attack means of the subgoal is complete", specifically, is assumed as a state in which a version of a vulnerable OS is identified as information for intruding into a different terminal. Or, a state is assumed where since a port of telnet is open, such information as a brute force attack is possible is obtained as information for intruding into a different terminal.

In step S103, the means selection unit 120 selects as an attack means to be executed, the attack means with the attack detection probability that is the lowest from among the attack means enumerated. Even if the attack means with the attack detection probability that is the lowest is carried out, however, there is also a case where information necessary cannot be obtained. In such a case, the means selection unit 120 selects a means with an attack detection probability that is second lowest, and executes the attack means. As described, the attack means are executed in order from the attack means with the attack detection probability that is low until the information necessary for the attack means of the subgoal is completed.

Figure 5:
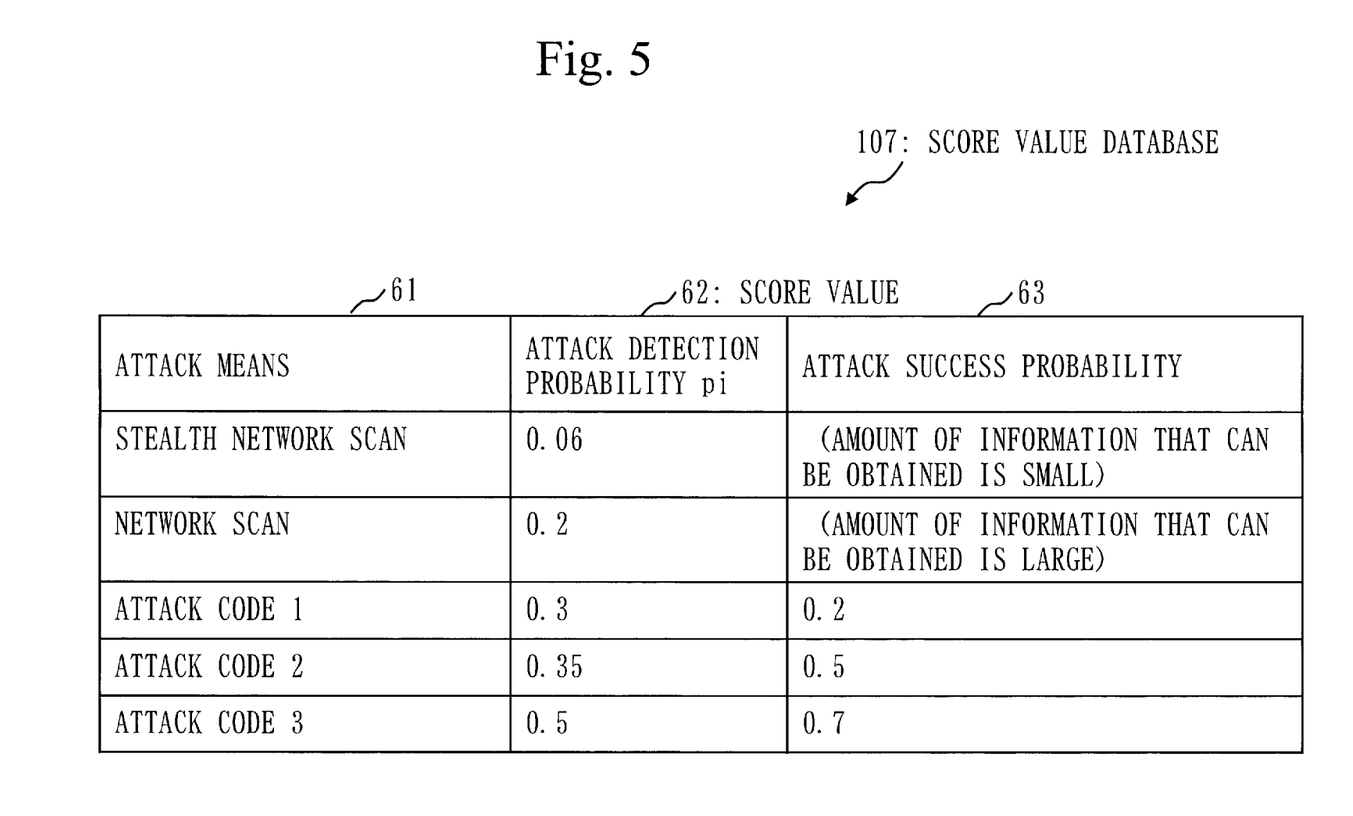
FIG. 5 is an example of a configuration of the score value database according to Embodiment 1.

FIG. 5 is a diagram illustrating an example of a configuration of the score value database 107 according to the present embodiment.

As illustrated in FIG. 5, an attack means 61, attack detection probability pi that is a score value 62 of each attack means, and an attack success probability 63 are set in the score value database 107.

The result analysis unit 150 sets in the score value database 107, the attack success probability 63 of the attack means 61 based on an execution result of the attack means 61. For example, the result analysis unit 150 recalculates an attack success probability based on information such as a response from the attack target system, and by reflecting the attack success probability in the score value database 107, the attack success probability 63 is refined.

Other Configurations

In the present embodiment, the functions of the score value calculation unit 110, the means selection unit 120, the means execution unit 130, the result collection unit 140, the result analysis unit 150, and the condition obtaining unit 160 are enabled by software. As a variation, the functions of the score value calculation unit 110, the means selection unit 120, the means execution unit 130, the result collection unit 140, the result analysis unit 150, and the condition obtaining unit 160 may be enabled by hardware.

Figure 6:
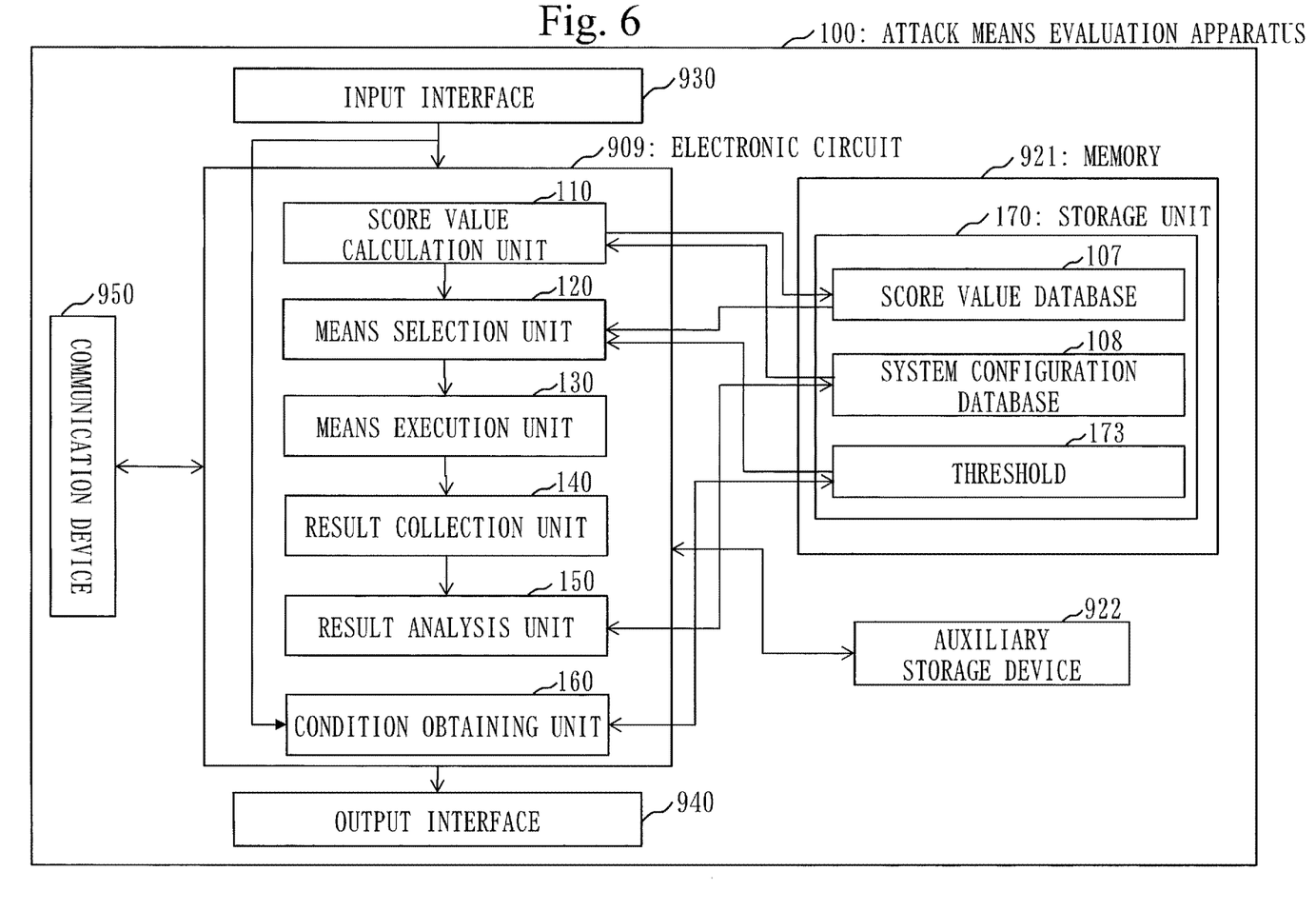
FIG. 6 is an example of a configuration of an attack means evaluation apparatus according to a variation of Embodiment 1.

Specifically, the attack means evaluation apparatus 100 includes an electronic circuit 909 in place of the processor 910.

FIG. 6 is a diagram illustrating a configuration of an attack means evaluation apparatus 100 according to a variation of the present embodiment.

The electronic circuit 909 is a dedicated electronic circuit that enables the functions of the score value calculation unit 110, the means selection unit 120, the means execution unit 130, the result collection unit 140, the result analysis unit 150, and the condition obtaining unit 160. The electronic circuit 909 is, specifically, a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the score value calculation unit 110, the means selection unit 120, the means execution unit 130, the result collection unit 140, the result analysis unit 150, and the condition obtaining unit 160 may be enabled by one electronic circuit or may be enabled by being distributed to a plurality of electronic circuits.

As another variation, a part of the functions of the score value calculation unit 110, the means selection unit 120, the means execution unit 130, the result collection unit 140, the result analysis unit 150, and the condition obtaining unit 160 may be enabled by the electronic circuit and the rest of the functions may be enabled by software. A part or all of the functions of the score value calculation unit 110, the means selection unit 120, the means execution unit 130, the result collection unit 140, the result analysis unit 150, and the condition obtaining unit 160 may be enabled by firmware.

Each of the processor and the electronic circuit is also called processing circuitry. In other words, the functions of the score value calculation unit 110, the means selection unit 120, the means execution unit 130, the result collection unit 140, the result analysis unit 150, and the condition obtaining unit 160 are enabled by the processing circuitry.

Description of Effect of Present Embodiment

As described above, in the present embodiment, the attack means evaluation apparatus 100 including the functions below has been described.

(a) The attack means evaluation apparatus 100 has a function to score the attack means based on the evaluation axis set. Scoring is quantifying, for example, to calculate the attack detection probability.

(b) The score value of the attack means changes according to the condition such as the attack target system.

(c) The attack means evaluation apparatus 100 selects the attack means with the score value that is best, and executes the cyberattack.

(d) The attack means evaluation apparatus 100 provides feedback on the information on the attack target system obtained at a time of execution of the attack means to a system configuration database. As a result, the score values indicated in (a) and (b) change, and the score value of the attack means is refined at each attack execution.

With the attack means evaluation apparatus 100 according to the present embodiment, a sophisticated cyberattack can be reproduced without necessitating a skilled penetration tester by scoring the attack means that must be executed.

Embodiment 2

In the present embodiment, mainly differing points from Embodiment 1 and points to be added to Embodiment 1 will be described.

In the present embodiment, with regard to a configuration having similar functions as the configuration in Embodiment 1, the same the reference signs are added, and the description will be omitted.

In Embodiment 1, it is made so that the attack means are executed from the attack means with a better score value. In the present embodiment, a mode in which scoring an entire attack scenario is also possible to be carried out by calculating a comprehensive score value as an attack scenario that is a column of the attack means, will be described.

The score value calculation unit 110, with regard to the attack scenario consisting of an attack means that configures the cyberattack, calculates scenario score value ps that shows validity of an attack on the attack target system.

The means selection unit 120 selects an attack scenario that is valid for the attack on the attack target system using scenario score value ps and threshold pth.

The means execution unit 130 executes the cyberattack on the attack target system by executing on the attack target system, the attack scenario that is selected.

For example, assuming that the score value of each attack means is attack detection probability pi, attack detection probability ps of an entire cyberattack to be executed can be shown by $ps=1-\Pi(1-pi)$.

For example, by causing a user to input threshold pth of the attack detection probability, the column of the attack means, that is, the attack scenario, that does not exceed threshold pth of the attack detection probability of the entire attack scenario can be created mechanically.

Embodiment 3

In the present embodiment, mainly differing points from Embodiments 1 and 2, and points to be added to Embodiments 1 and 2 will be described.

In the present embodiment, with regard to a configuration having similar functions as the configurations in Embodiment 1 and 2, the same the reference signs are added, and the description will be omitted.

In Embodiment 1 and 2, the score value of each attack means is one value. Unless configuration information of the attack target system, however, is known, to accurately calculate the score value such as the attack detection probability is difficult. For example, even when an attack detection probability of an attack code is 0.5 and an attack success probability is 0.7, in a case where the attack target system that uses an attack code does not have vulnerability, the attack success probability becomes 0, and selecting the attack means that uses the attack code would be futile.

To solve this, the score value of each attack means is made to change as in a function value. For example, the attack success probability is set to 0.5 when an OS of the attack target system is Windows (registered trademark), the attack success probability is set to 1.0 when the attack target system is discovered to have vulnerability, and the attack success probability is set to 0 when the OS is not an OS that is a target of the attack code or in a case where the vulnerability is remediated. As a result, selecting an attack means that will not be materialized can be prevented, and the attack means can be brought closer to a more sophisticated cyberattack. Since there are many unclear parts to the configuration of the attack target system in an initial stage of the attack, there may be a range to the score value as in 0.3 to 0.5 in the attack detection probability. Each time the attack proceeds, the configuration of the attack target system is discovered and the range of the score value can be narrowed.

With an attack means evaluation apparatus according to the present embodiment, as a threshold that a user has set, sequentially executing the attack means in a way that the attack detection probability does not exceed the attack detection probability that is determined by taking all of the attack means executed into consideration, and performing automatic execution of the cyberattack can be done.

In Embodiments 1 to 3 above, each unit of the attack means evaluation apparatus is described as an independent functional block. A configuration of the attack means evaluation apparatus, however, does not have to be in the configuration as in the embodiments mentioned above. The functional block of the attack means evaluation apparatus may be in any configuration as long as the functions described in the embodiments mentioned above can be enabled. The attack means evaluation apparatus may be a system configured of a plurality of devices, not of one device.

Of Embodiments 1 to 3, a plurality of parts may be combined and carried out. Or, of these embodiments, one part may be carried out. In addition, these embodiments may be combined and carried out in any manner, either fully or partially.

That is, in Embodiments 1 to 3, a free combination of each embodiment, a variation of any element in each embodiment, or omitting of any element in each embodiment is possible.

The embodiments mentioned above are essentially preferred examples, and are not intended to limit the scope of the present disclosure, the scope of application of the present disclosure, and the scope of use of the present disclosure. Various changes are possible to be made to the embodiments mentioned above as necessary.

REFERENCE SIGNS LIST

61: attack means; 62: score value; 63: attack success probability; 100: attack means evaluation apparatus; 110: score value calculation unit; 120: means selection unit; 130: means execution unit; 140: result collection unit; 150: result analysis unit; 160: condition obtaining unit; 170: storage unit; 107: score value database; 108: system configuration database; 173: threshold; 909: electronic circuit; 910: processor; 921: memory; 922: auxiliary storage device; 930: input interface; 940: output interface; 950: communication device.

The invention claimed is:

1. An attack means evaluation apparatus that evaluates an attack means used in a cyberattack, the attack means evaluation apparatus comprising:

processing circuitry configured to:

obtain a plurality of attack means, and for each attack means of the plurality of attack means, calculate a score value that shows validity of an attack on an attack target system, the attack target system being a target of the attack, each of the plurality of attack means configuring a different cyberattack on the attack target system, the plurality of attack means including a brute force attack and an exploitation of a vulnerable operating system, select an attack means that executes the attack on the attack target system from the plurality of attack means based on the score value, and execute the attack means that is selected on the attack target system, and verify whether or not an attack for achieving a final aim of the cyberattack is possible based on an execution result of the attack means that is selected; and a memory to store a system configuration database in which a system configuration of the attack target system is set, wherein the processing circuitry is further configured to calculate the score value based on the system configuration of the attack target system included in the system configuration database, the system configuration including an operating system of the attack target system and a state of a port being open.

2. The attack means evaluation apparatus according to claim 1, wherein the processing circuitry when verifying that the attack for achieving the final aim is possible, executes the attack for achieving the final aim.

3. The attack means evaluation apparatus according to claim 1, wherein
the processing circuitry
calculates as the score value, an attack detection probability that shows a degree of how easily detected an attack is in the attack target system.

4. The attack means evaluation apparatus according to claim 1, wherein
the processing circuitry
when the attack for achieving the final aim is verified as not possible, analyzes the system configuration of the attack target system based on the execution result of the attack means that is selected, and provides feedback on an analysis result to the system configuration database, and
recalculates the score value based on the system configuration of the attack target system included in the system configuration database to where the feedback on the analysis result is provided.

5. The attack means evaluation apparatus according to claim 1, wherein
the processing circuitry
with regard to an attack scenario consisting of an attack means that configures the cyberattack, calculates a scenario score value that shows validity of an attack on the attack target system,
selects an attack scenario that is valid for the attack on the attack target system using the scenario score value, and
executes the cyberattack on the attack target system by executing on the attack target system, the attack scenario that is selected.

6. An attack means evaluation method of an attack means evaluation apparatus that evaluates an attack means used in a cyberattack, the attack means evaluation method comprising:
obtaining a plurality of attack means, and for each attack means of the plurality of attack means, calculating a score value that shows validity of an attack on an attack target system, the attack target system being a target of the attack, each of the plurality of attack means configuring a different cyberattack on the attack target system, the plurality of attack means including a brute force attack and an exploitation of a vulnerable operating system;
selecting an attack means that executes the attack on the attack target system from the plurality of attack means based on the score value;
executing the attack means that is selected on the attack target system, and verifying whether or not an attack for achieving a final aim of the cyberattack is possible based on an execution result of the attack means that is selected; and
storing, in a memory, a system configuration database in which a system configuration of the attack target system is set, wherein
calculating the score value is further based on the system configuration of the attack target system included in the system configuration database, the system configuration including an operating system of the attack target system and a state of a port being open.

7. A non-transitory computer readable medium storing an attack means evaluation program of an attack means evaluation apparatus that evaluates an attack means used in a cyberattack, the attack means evaluation program causing a computer to execute:
a score value calculation process to obtain a plurality of attack means, and for each attack means of the plurality of attack means, to calculate a score value that shows validity of an attack on an attack target system, the attack target system being a target of the attack, each of the plurality of attack means configuring a different cyberattack on the attack target system, the plurality of attack means including a brute force attack and an exploitation of a vulnerable operating system;
a means selection process to select an attack means that executes the attack on the attack target system from the plurality of attack means based on the score value; and
a means execution process to execute the attack means that is selected on the attack target system, and to verify whether or not an attack for achieving a final aim of the cyberattack is possible based on an execution result of the attack means that is selected; and
a memory storing a system configuration database in which a system configuration of the attack target system is set, wherein
calculating the score value is further based on the system configuration of the attack target system included in the system configuration database, the system configuration including an operating system of the attack target system and a state of a port being open.

* * * * *